(12) United States Patent
Li et al.

(10) Patent No.: US 12,480,248 B2
(45) Date of Patent: Nov. 25, 2025

(54) CONDENSER FOR DRYING EQUIPMENT, AND DRYING EQUIPMENT

(71) Applicants: Chongqing Haier Roller Washing Machine Co., Ltd., Chongqing (CN); QINGDAO HAIER DRUM WASHING MACHINE CO., LTD., Shandong (CN); Haier Smart Home Co., Ltd., Shandong (CN)

(72) Inventors: Tao Li, Qingdao (CN); Long Yang, Qingdao (CN); Yonghong Xu, Qingdao (CN); Zhenliang Liu, Qingdao (CN)

(73) Assignees: Chongqing Haier Roller Washing Machine Co., Ltd., Chongqing (CN); QINGDAO HAIER DRUM WASHING MACHINE CO., LTD., Qingdao (CN); Haier Smart Home Co. Ltd., Qingdao (CN)

( * ) Notice: Subject to any disclaimer, the term of this patent is extended or adjusted under 35 U.S.C. 154(b) by 623 days.

(21) Appl. No.: 17/927,802

(22) PCT Filed: May 12, 2021

(86) PCT No.: PCT/CN2021/093374
§ 371 (c)(1),
(2) Date: Nov. 25, 2022

(87) PCT Pub. No.: WO2021/223766
PCT Pub. Date: Nov. 11, 2021

(65) Prior Publication Data
US 2023/0212812 A1    Jul. 6, 2023

(30) Foreign Application Priority Data
Jun. 2, 2020 (CN) .......................... 202010490515.X

(51) Int. Cl.
*F26B 21/02* (2006.01)
*D06F 58/24* (2006.01)
(Continued)

(52) U.S. Cl.
CPC .................................... *D06F 58/24* (2013.01)

(58) Field of Classification Search
CPC .......... D06F 58/24; D06F 58/30; D06F 58/38; D06F 25/00; F26B 21/02; F28B 5/00; F25D 21/00
(Continued)

(56) References Cited

U.S. PATENT DOCUMENTS 5,291,751 A * 3/1994 Perez .................... F26B 25/006
62/332
2010/0223741 A1 9/2010 Grunert
2014/0250710 A1 * 9/2014 Yang .................... F26B 21/086
34/73

FOREIGN PATENT DOCUMENTS

CN    1782174 A    6/2006
CN    1782215 A    6/2006
(Continued)

OTHER PUBLICATIONS

English copy of CN107083640 by PE2E Aug. 1, 2025.*
(Continued)

*Primary Examiner* — Deming Wan
(74) *Attorney, Agent, or Firm* — Maier & Maier, PLLC

(57) ABSTRACT

A condenser for drying equipment, and drying equipment. The front side wall of a hollow chamber of the condenser includes a first arc structure, a second arc structure, and a flow dividing structure; the flow dividing structure is opposite to an air inlet; the left and right side walls of the hollow chamber are arc-shaped; the flow dividing structure can divide the gas entering from the air inlet into a first airflow
(Continued)

and a second airflow, and enable the first airflow and the second airflow to enter the first arc structure and the second arc structure along a tangential direction of the first arc structure and second arc structure, to provide centrifugal and rotational airflow. Since the first airflow and the second airflow rise centrifugally and rotationally, the strokes of the first airflow and the second airflow in a condenser body are lengthened, thus improving the cooling effect.

10 Claims, 7 Drawing Sheets

(51) Int. Cl.
    *F25D 21/00*     (2006.01)
    *F28B 5/00*     (2006.01)
(58) Field of Classification Search
    USPC .............................................................. 34/73
    See application file for complete search history.

(56) References Cited

FOREIGN PATENT DOCUMENTS

| | | | | |
|---|---|---|---|---|
| CN | 105088627 A | | 11/2015 | |
| CN | 107083640 A | * | 8/2017 | ............. D06F 37/08 |
| CN | 206593344 U | | 10/2017 | |
| CN | 104711833 A | | 1/2019 | |
| CN | 109234999 A | | 1/2019 | |
| CN | 208936597 U | | 6/2019 | |
| CN | 110093765 A | | 8/2019 | |

OTHER PUBLICATIONS

International Search Report issued on Jul. 26, 2021, in connection with corresponding International Patent Application No. PCT/CN2021/093374; 8 pages.

* cited by examiner

C-C

CONDENSER FOR DRYING EQUIPMENT, AND DRYING EQUIPMENT

FIELD

The present disclosure belongs to the technical field of drying apparatus, and specifically provides a condenser for a drying apparatus and a drying apparatus.

BACKGROUND

A drying apparatus refers to a machine capable of using hot air to dry clothing. Drying apparatuses mainly include a washing-drying integrated machine, a clothing dryer or a drying machine, etc.

Taking the washing-drying integrated machine as an example, it mainly includes a cabinet, as well as a clothing treatment drum, a heating device, a condenser and a fan that are arranged inside the cabinet. The fan provides power to enable air to circulate between the clothing treatment drum, the heating device and the condenser. Under the action of the heating device, dry air is heated into dry hot air, which then enters the clothing treatment drum to exchange heat with wet clothing, taking away the moisture in the clothing to form a relatively humid hot air; the relatively humid hot air then enters the condenser; after being subjected to a condensing effect of the condenser, the moisture in the relatively humid hot air is condensed into water, which is then discharged through a drain pipe, whereas the air after condensation becomes relatively dry cold air, which is then heated into dry hot air by the heating device before the process enters the next cycle; such a process is repeated again and again until the drying program is completed.

There are many condensation modes that the condenser adopts, a common one of which is to use water as a cooling medium to exchange heat with drying air, so that the moisture in hot air is condensed and separated from the air. Such condensers usually have a channel-like body to which a cooling water pipe is connected. The humid hot drying air passes through the condenser body from bottom to top, during which the cooling water flows out from top to bottom and exchanges heat with the humid hot air. However, due to limitations in the space, a spatial height of the condenser body is limited, and a heat exchange travel between the humid hot air and the cooling water is very short.

Chinese patent publication No. CN104711833B discloses a clothing dryer, which includes a drum for accommodating clothing, a condenser communicating with the drum space, and a fan for promoting air to flow from the drum to the condenser; the condenser has a body, an air inflow passage connected near a bottom of the body, and an air outlet near a top of the body. The air inflow passage extends substantially in a tangential direction of the cross section of the body, so that the air entering the body from the air inflow passage rises centrifugally and rotationally along a side wall of the body. That is, by making the air rise centrifugally and rotationally along the side wall of the body, the travel of the air in the condenser body becomes longer, so that more heat exchange can be obtained. However, as shown in FIG. 1 of the above-mentioned patent, the space for installing the condenser in the cabinet of the conventional clothing dryer is narrow and long; the space in a length direction is relatively large, but the space in a width direction is relatively limited. Due to the limitation in the width direction, the size of the body of the condenser in above-mentioned patent is relatively small, so that a heat exchange space of the body of the condenser is also relatively small.

Accordingly, there is a need in the art for a new condenser for a drying apparatus and a corresponding drying apparatus to solve the above problem.

SUMMARY

In order to solve the above problem in the prior art, that is, to solve the problem of poor cooling effect of the condenser of existing drying apparatus, the present disclosure provides a condenser for a drying apparatus, the condenser including a body and a cooling water pipe; in which a water outflow end of the cooling water pipe communicates with a hollow chamber formed inside the body, and a front side wall of the hollow chamber is provided with a first arc-shaped structure, a second arc-shaped structure and a flow splitting structure located between the first arc-shaped structure and the second arc-shaped structure; a gas inlet is provided on a rear side wall of the hollow chamber, and the flow splitting structure is opposite to the gas inlet; both a left side wall and a right side wall of the hollow chamber are configured to be arc-shaped, two ends of the left side wall are smoothly connected with the first arc-shaped structure and the rear side wall respectively, and two ends of the right side wall are smoothly connected with the second arc-shaped structure and the rear side wall respectively; the flow splitting structure is arranged to be capable of splitting a gas entering from the gas inlet into a first gas flow and a second gas flow, and is arranged to enable the first gas flow and the second gas flow to enter the first arc-shaped structure and the second arc-shaped structure substantially in a tangential direction of the first arc-shaped structure and a tangential direction of the second arc-shaped structure respectively, thereby enabling the first gas flow to rise centrifugally and rotationally along the first arc-shaped structure, the left side wall and a left part of the rear side wall, and enabling the second gas flow to rise centrifugally and rotationally along the second arc-shaped structure, the right side wall and a right part of the rear side wall.

In a preferred technical solution of above condenser, the flow splitting structure is arranged in a left-and-right symmetrical manner, and a central line of the flow splitting structure coincides with a central line of the gas inlet, so that the first gas flow and the second gas flow have substantially the same flow rate.

In a preferred technical solution of above condenser, the rear side wall is provided with a first arc-shaped guide structure and a second arc-shaped guide structure, so that the first gas flow and the second gas flow can smoothly flow toward the first arc-shaped structure and the second arc-shaped structure respectively.

In a preferred technical solution of above condenser, the front side wall is provided with a water guide groove, a top end of the water guide groove is connected with the water outflow end of the cooling water pipe, and a bottom end of the water guide groove is connected with the flow splitting structure.

In a preferred technical solution of above condenser, the water guide groove is inclinedly arranged in a direction approaching the rear side wall from top to bottom.

In a preferred technical solution of above condenser, the flow splitting structure is inclinedly arranged in a direction away from the rear side wall from top to bottom.

In a preferred technical solution of above condenser, the flow splitting structure includes a first arc-shaped flow splitting part and a second arc-shaped flow splitting part; one end of the first arc-shaped flow splitting part is smoothly connected with the first arc-shaped structure, the other end of the first arc-shaped flow splitting part is smoothly connected with one end of the second arc-shaped flow splitting part, and the other end of the second arc-shaped flow splitting part is smoothly connected with the second arc-shaped structure.

In a preferred technical solution of above condenser, the left part of the rear side wall is provided with a first water intercepting groove, so that water droplets in the first gas flow are separated from the first gas flow.

In a preferred technical solution of above condenser, the right part of the rear side wall is provided with a second water intercepting groove, so that water droplets in the second gas flow are separated from the first gas flow.

In another aspect, the present disclosure also provides a drying apparatus, which includes the condenser described above.

It can be understood by those skilled in the art that in the preferred technical solutions of the present disclosure, the front side wall of the hollow chamber of the condenser is provided with the first arc-shaped structure, the second arc-shaped structure and the flow splitting structure located between the first arc-shaped structure and the second arc-shaped structure; both the left side wall and the right side wall of the hollow chamber are configured to be arc-shaped, two ends of the left side wall are smoothly connected with the first arc-shaped structure and the rear side wall respectively, and two ends of the right side wall are smoothly connected with the second arc-shaped structure and the rear side wall respectively; a gas inlet is provided on the rear side wall of the hollow chamber, and the flow splitting structure is opposite to the gas inlet. Through such arrangements, the gas coming from the gas inlet can just hit the flow splitting structure, and the flow splitting structure can split the gas flow into a first gas flow and a second gas flow. Moreover, the flow splitting structure enables the first gas flow to enter the first arc-shaped structure substantially in a tangential direction of the first arc-shaped structure and then rise centrifugally and rotationally along the first arc-shaped structure, the left side wall and the left part of the rear side wall, and enables the second gas flow to enter the second arc-shaped structure substantially in a tangential direction of the second arc-shaped structure and then rise centrifugally and rotationally along the second arc-shaped structure, the right side wall and the right part of the rear side wall. By enabling the first gas flow and the second gas flow to rise centrifugally and rotationally, travels of the first gas flow and the second gas flow in the condenser body are lengthened, so that the cooling effect can be improved. In addition, as compared with the condenser disclosed in Chinese patent publication No. CN104711833B, in the case of the same size in the width direction, the size of the condenser of the present disclosure in the length direction is larger; accordingly, the heat exchange space in the body of the condenser is larger, and the cooling effect is better.

Further, the flow splitting structure is arranged in a left-and-right symmetrical manner, and a central line of the flow splitting structure coincides with a central line of the gas inlet. Through such an arrangement, the first gas flow and the second gas flow have substantially the same flow rate. As such, after the first gas flow and the second gas flow meet at a position close to the rear side wall, they will not scatter each other, but can flow toward the front side wall in parallel under the interaction, and then respectively enter the first arc-shaped structure and the second arc-shaped structure arranged on the front side wall.

Further, the rear side wall is provided with a first arc-shaped guide structure and a second arc-shaped guide structure, so that the first gas flow and the second gas flow can smoothly flow toward the first arc-shaped structure and the second arc-shaped structure respectively. Through such an arrangement, under the guidance of the first arc-shaped guide structure and the second arc-shaped guide structure, the first gas flow and the second gas flow can be prevented from a direct head-on collision with each other. When the first gas flow and the second gas flow meet, a movement trend of the first gas flow and a movement trend of the second gas flow are both toward the front side wall. Therefore, after the first gas flow and the second gas flow meet, they can interact with each other, so that the first gas flow moves toward the first arc-shaped structure, and the second gas flow moves toward the second arc-shaped structure.

Further, the front side wall is provided with a water guide groove, a top end of the water guide groove is connected with the water outflow end of the cooling water pipe, and a bottom end of the water guide groove is connected with the flow splitting structure. Through such an arrangement, when the cooling water flows onto the flow splitting structure, it is hit by the gas (the gas entering from the gas inlet will directly hit the flow splitting structure). Under the action of the hitting force, the water flow is broken up into water films, the heat exchange area becomes larger, and a more sufficient heat exchange can be performed with the gas, which can improve the cooling effect. Moreover, after the water flow is broken up, it can still move together with the first gas flow and second gas flow, thus further increasing the heat exchange area and further improving the cooling effect.

Further, the flow splitting structure is inclinedly arranged in a direction away from the rear side wall from top to bottom. Through such an arrangement, the adhesion between the cooling water and the surface of the flow splitting structure can be reduced, so that the water flow can be broken up more easily.

Further, the water guide groove is inclinedly arranged in a direction approaching the rear side wall from top to bottom. Through such an arrangement, the cooling water can be prevented from coming out of contact with the water guide groove, and the cooling water can smoothly flow along the water guide groove.

Further, the flow splitting structure includes a first arc-shaped flow splitting part and a second arc-shaped flow splitting part; one end of the first arc-shaped flow splitting part is smoothly connected with the first arc-shaped structure, the other end of the first arc-shaped flow splitting part is smoothly connected with one end of the second arc-shaped flow splitting part, and the other end of the second arc-shaped flow splitting part is smoothly connected with the second arc-shaped structure. Through such an arrangement, the surface area of the flow splitting structure is large, which is more advantageous for breaking up the water flow.

In addition, the drying apparatus further provided by the present disclosure on the basis of above technical solutions, due to the use of the above condenser, has the technical effect that can be brought about by the condenser. As compared with the existing drying apparatuses, the drying apparatus of the present disclosure has a higher drying efficiency.

BRIEF DESCRIPTION OF DRAWINGS

Preferred embodiment of the present disclosure will be described below with reference to accompanying drawing and in connection with a washing-drying integrated machine. In the drawing.

DETAILED DESCRIPTION

Preferred embodiments of the present disclosure will be described below with reference to the accompanying drawings. It should be understood by those skilled in the art that these embodiments are only used to explain the technical principles of the present disclosure, and are not intended to limit the scope of protection of the present disclosure. For example, although the following embodiments are described in conjunction with a washing-drying integrated machine, the present disclosure is still applicable to other drying apparatuses, such as a clothing dryer or a drying machine, etc. Such adjustments and changes to the application object do not depart from the principle and scope of the present disclosure, and they should all be limited within the scope of protection of the present disclosure.

It should be noted that in the description of the present disclosure, terms indicating directional or positional relationships, such as "upper", "lower", "left", "right", "front", "rear", "top", "bottom", "inner", "outer" and the like, are based on the directional or positional relationships shown in the accompanying drawings. They are only used for ease of description, and do not indicate or imply that the device or element must have a specific orientation, or be constructed or operated in a specific orientation, and therefore they should not be considered as limitations to the present disclosure. In addition, terms "first" and "second" are only used for descriptive purposes, and should not be interpreted as indicating or implying relative importance.

In addition, it should also be noted that in the description of the present disclosure, unless otherwise clearly specified and defined, terms "install", "connect" and "connection" should be understood in a broad sense; for example, the connection may be a fixed connection, or may also be a detachable connection, or an integral connection; it may be a mechanical connection, or an electrical connection; it may be a direct connection, or an indirect connection implemented through an intermediate medium, or it may be internal communication between two elements. For those skilled in the art, the specific meaning of the above terms in the present disclosure can be interpreted according to specific situations.

In view of the problem of poor cooling effect of the condenser of existing washing-drying integrated machines point out in the "BACKGROUND", the present disclosure provides a condenser for a washing-drying integrated machine and a washing-drying integrated machine, aiming at improving the cooling effect of the condenser.

Figure 1:
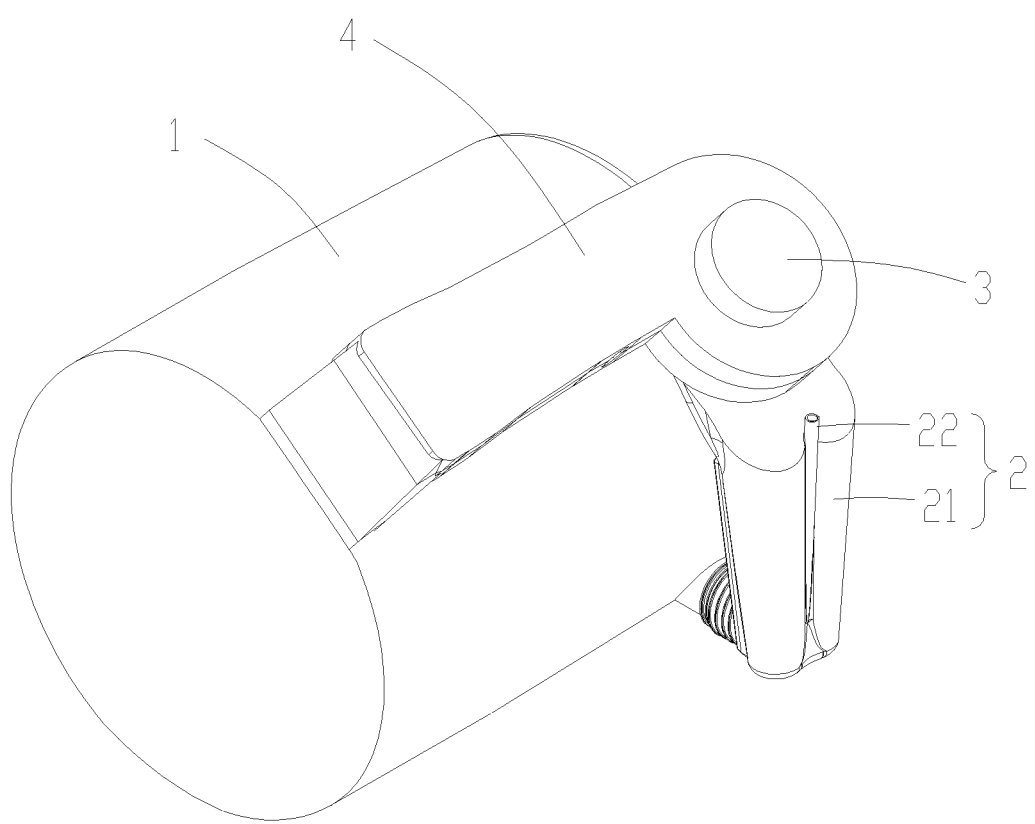
FIG. 1 is a schematic structural view of a washing-drying integrated machine of the present disclosure.

First, reference is made to FIG. 1, which is a schematic structural view of a washing-drying integrated machine of the present disclosure. As shown in FIG. 1, the washing-drying integrated machine of the present disclosure includes a cabinet (not shown in the figure), as well as a drying drum 1, a condenser 2, a fan 3, a heating device (not shown in the figure) and an air pipe 4 that are arranged in the cabinet. The heating device is installed in the air pipe 4, one end of the air pipe 4 communicates with the drying drum 1, and the other end of the air pipe 4 communicates with the fan 3. The fan 3 is installed between the condenser 2 and the air pipe 4. When the washing-drying integrated machine is running, under the action of the fan 3, air can circulate between the drying drum 1, the condenser 2 and the heating device. Under the action of the heating device, dry air is heated into dry hot air, which then enters the drying drum 1 along the air pipe 4 to exchange heat with wet clothing and takes away the moisture in the clothing to form relatively humid hot air which then enters the condenser 2; after being subjected to a condensing effect of the condenser 2, the moisture in the relatively humid hot air is condensed into water; the condensed air becomes relatively dry cold air, which then enters the air pipe 4 and is heated by the heating device into dry hot air before the process enters the next cycle; such a process is repeated again and again until the drying program is completed. The heating device may be a heating pipe or a heating rod, etc. Those skilled in the art can flexibly set the specific structural type of the heating device in practical applications, as long as the air can be heated by the heating device.

Figure 2:
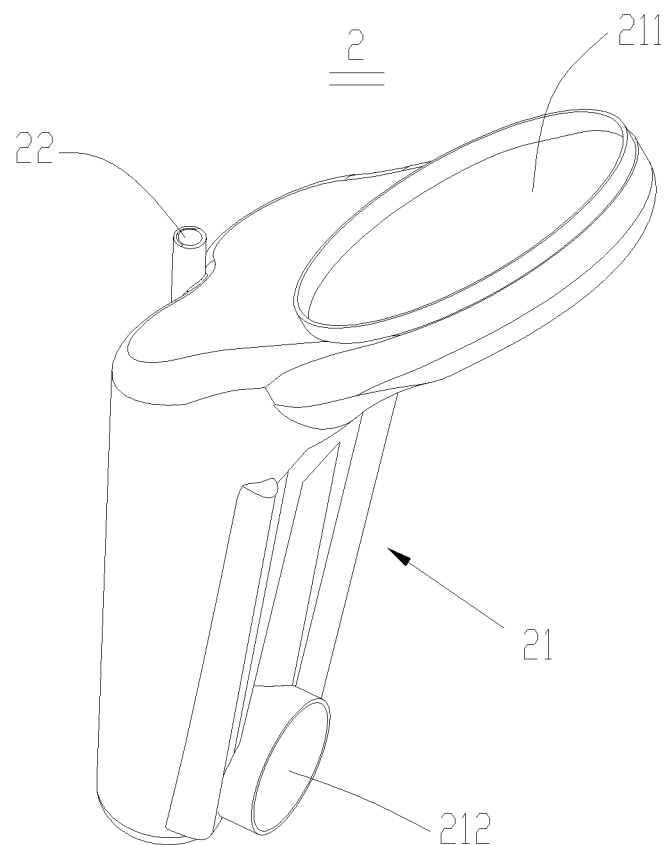
FIG. 2 is a first schematic structural view of a condenser of the present disclosure.
Figure 3:
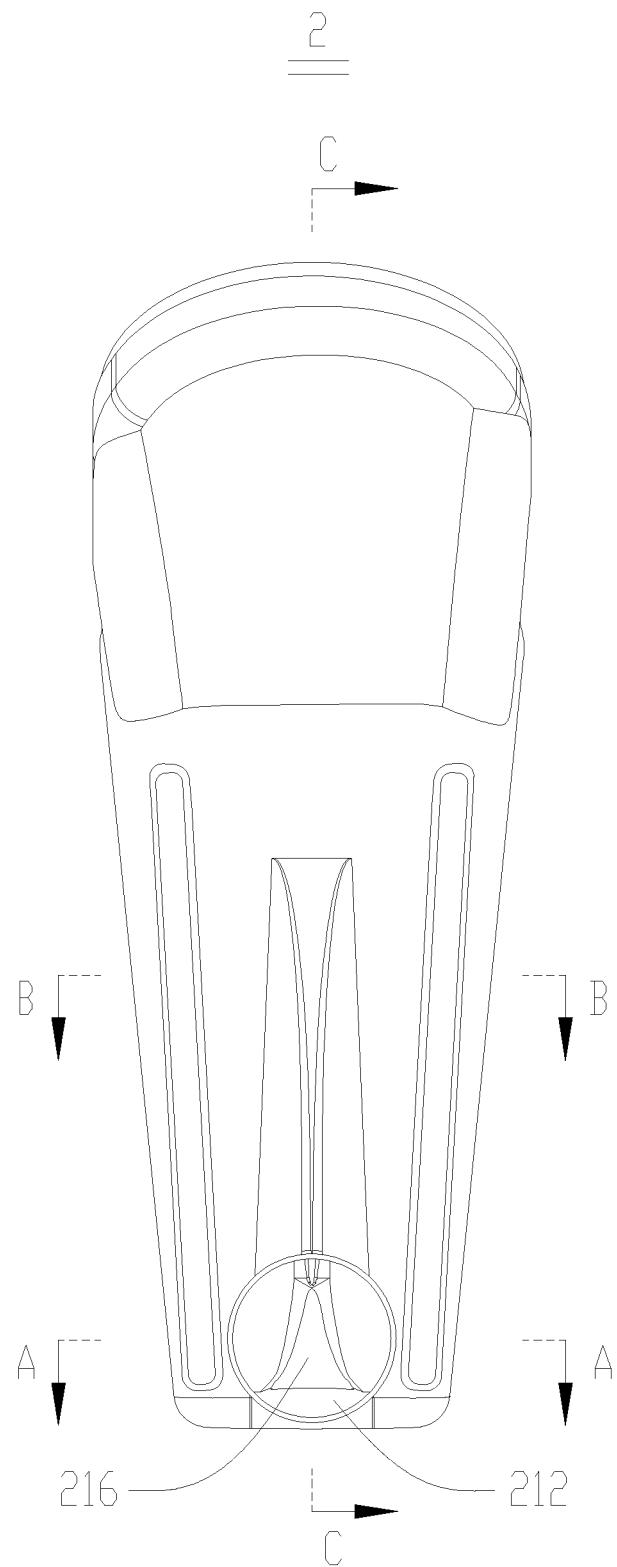
FIG. 3 is a second schematic structural view of the condenser of the present disclosure.
Figure 7:
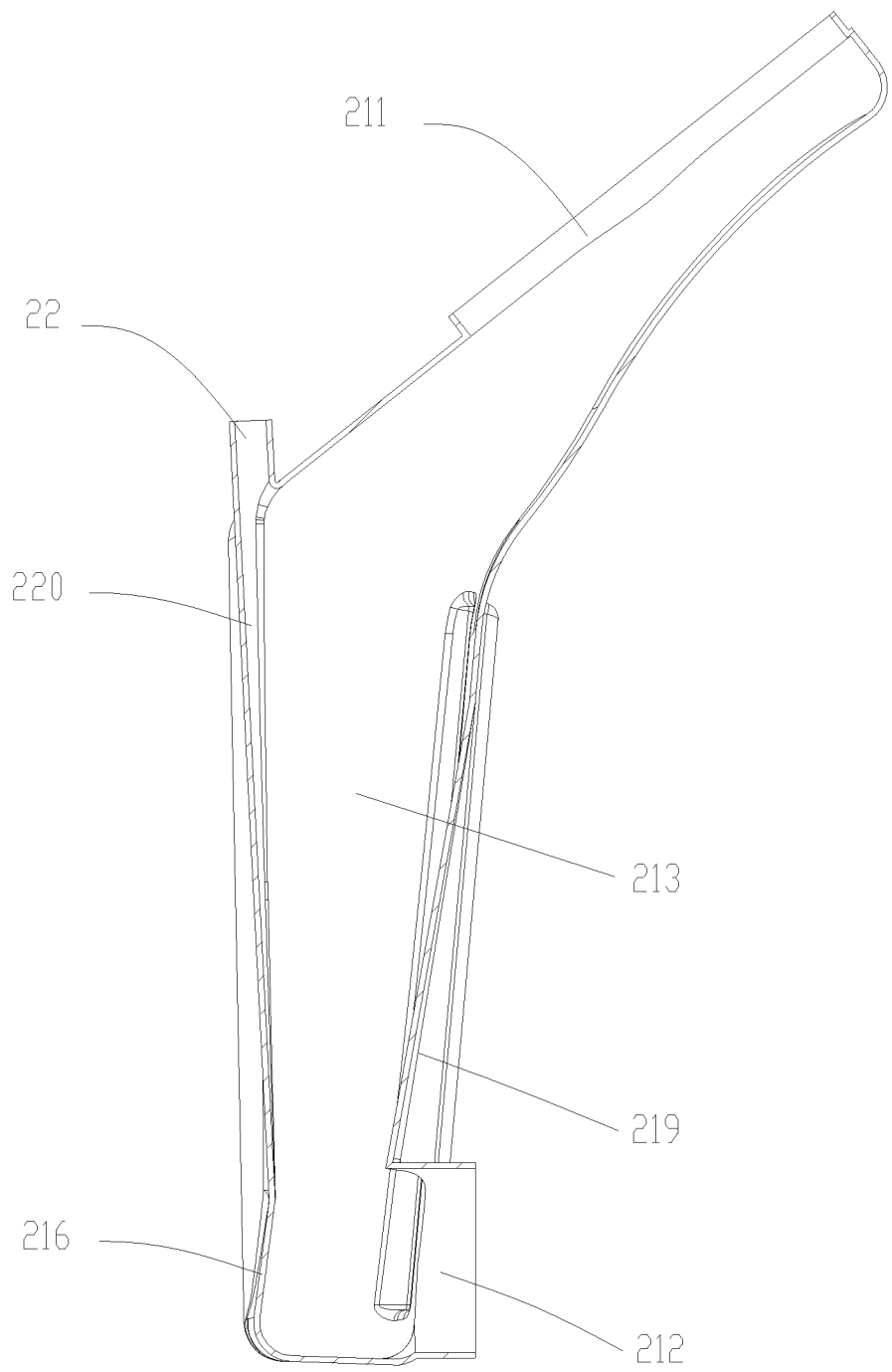
FIG. 7 is a cross sectional view of section C-C in FIG. 3.

Next, reference is made to FIGS. 2, 3 and 7, in which FIG. 2 is a first schematic structural view of the condenser of the present disclosure, FIG. 3 is a second schematic structural view of the condenser of the present disclosure, and FIG. 7 is a cross sectional view of section C-C in FIG. 3.

As shown in FIGS. 2, 3 and 7, the condenser 2 of the present disclosure includes a body 21 and a cooling water pipe 22; an upper part of the body 21 is provided with an air outlet 211, and a lower part of the body 21 is provided with an air inlet 212. A hollow chamber 213 is formed inside the body 21, a top of the hollow chamber 213 communicates with the air outlet 211, a bottom of the hollow chamber 213 communicates with the air inlet 212, and a water outflow end of the cooling water pipe 22 communicates with the hollow chamber 213. When the washing-drying integrated machine is running, the cooling water pipe 22 can provide cooling water into the hollow chamber 213, and the humid hot air discharged from the drying drum 1 enters the hollow chamber 213 from the air inlet 212 to exchange heat with the cooling water in the hollow chamber 213. The moisture in the humid hot air is condensed into water, and the condensed air becomes relatively dry cold air, which is then discharged through the air outlet 211.

Figure 4:
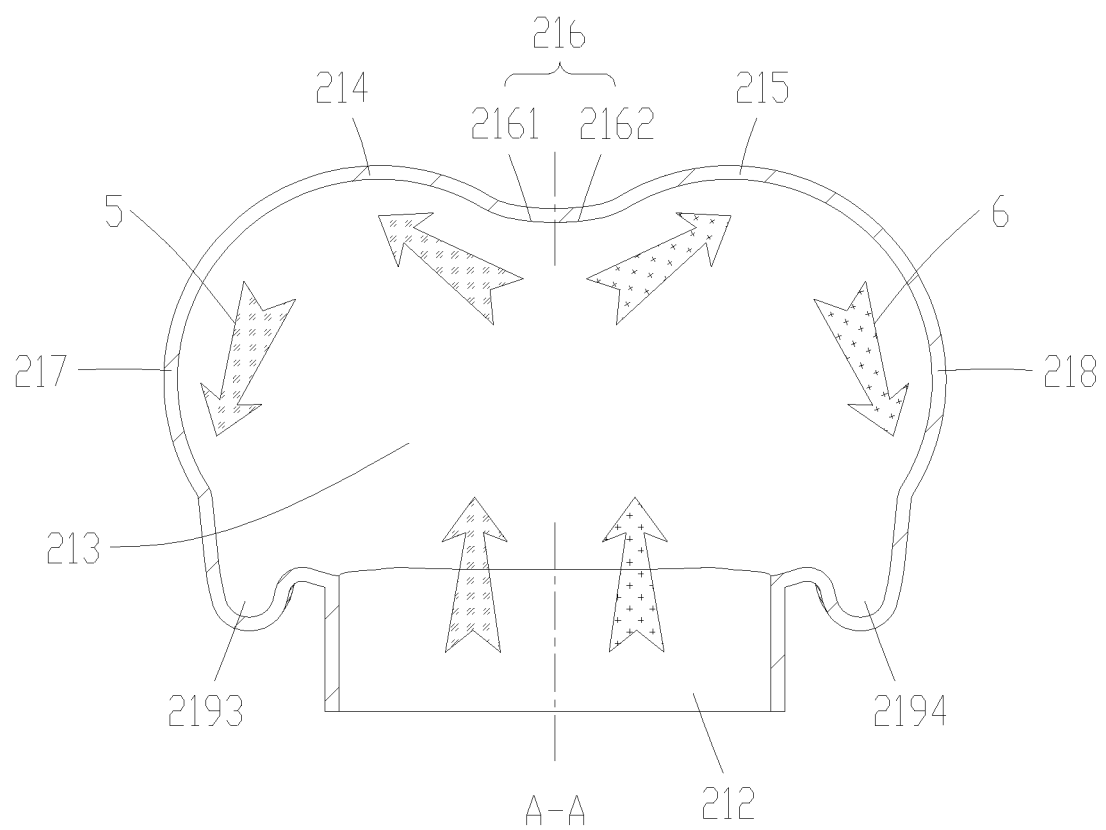
FIG. 4 is a first cross sectional view of section A-A in FIG. 3.
Figure 5:
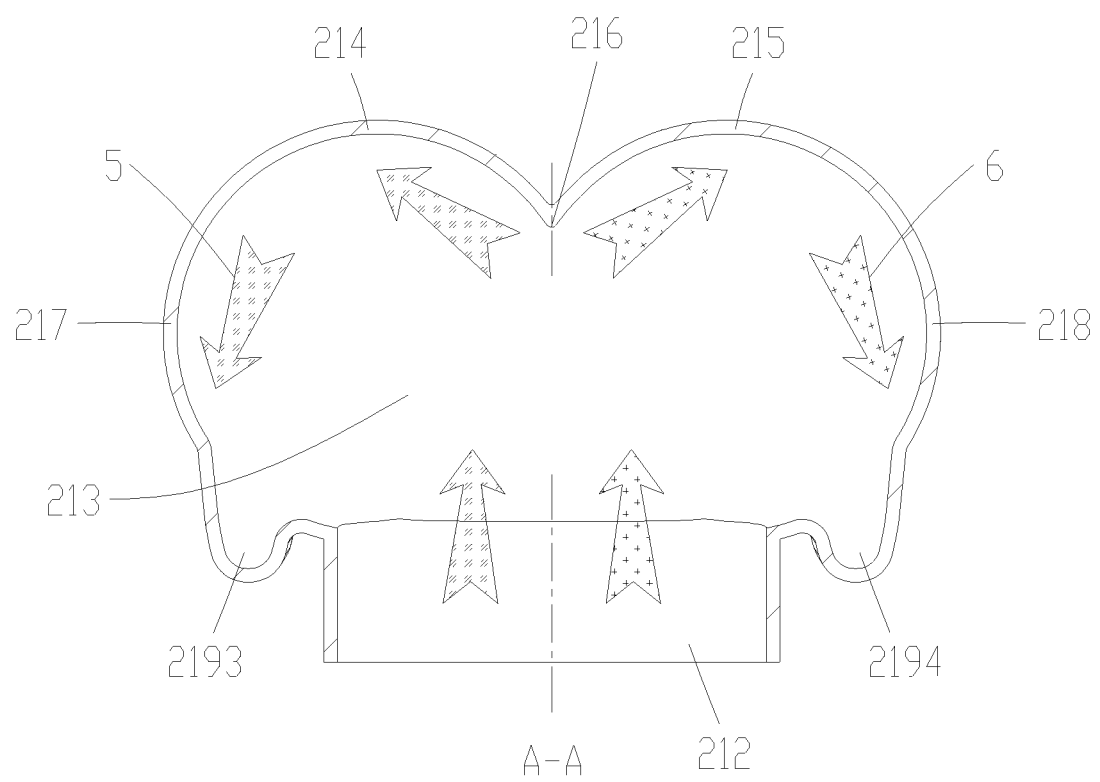
FIG. 5 is a second cross sectional view of section A-A in FIG. 3.
Figure 6:
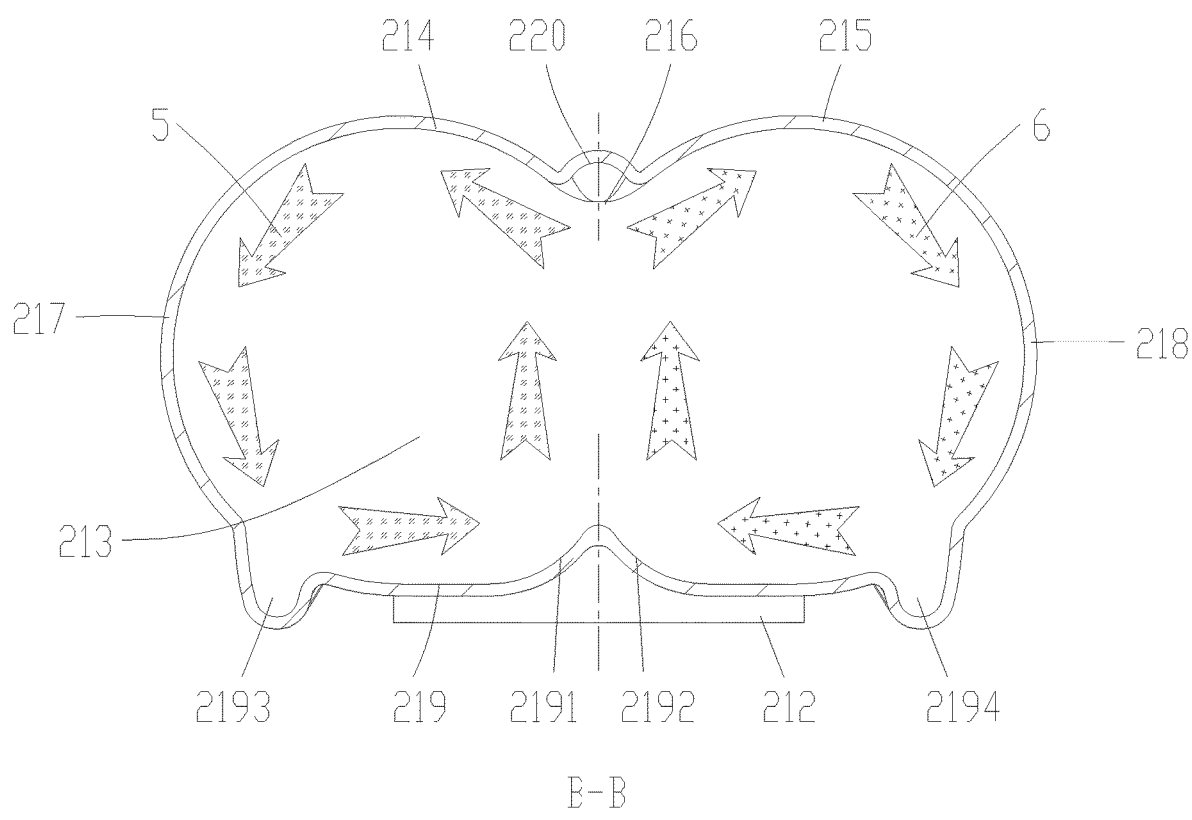
FIG. 6 is a cross sectional view of section B-B in FIG. 3.

Next, reference is made to FIGS. 3 to 6, in which FIG. 4 is a first cross sectional view of section A-A in FIG. 3, FIG. 5 is a second cross sectional view of section A-A in FIG. 3, and FIG. 6 is a cross sectional view of section B-B in FIG. 3.

As shown in FIGS. 3 to 6, a front side wall of the hollow chamber 213 is provided with a first arc-shaped structure 214, a second arc-shaped structure 215, and a flow splitting structure 216 located between the first arc-shaped structure 214 and the second arc-shaped structure 215. A left side wall 217 and a right side wall 218 of the hollow chamber 213 are both configured to be arc-shaped. Two ends of the left side wall 217 are smoothly connected with the first arc-shaped structure 214 and the rear side wall 219 respectively, and two ends of the right side wall 218 are smoothly connected with the second arc-shaped structure 215 and the rear side wall 219 respectively. The air inlet 212 is arranged on the rear side wall 219 of the hollow chamber 213, and the flow splitting structure 216 is opposite to the air inlet 212. The gas entering from the air inlet 212 can just hit the flow splitting structure 216, and the flow splitting structure 216 can split the gas flow into two gas flows, denoted as a first gas flow 5 and a second gas flow 6. Moreover, the flow splitting structure 216 enables the first gas flow 5 to enter the first arc-shaped structure 214 substantially in a tangential direction of the first arc-shaped structure 214. Under a pushing action of a subsequent gas flow, the first gas flow 5 can rise centrifugally and rotationally along the first arc-shaped structure 214, the left side wall 217 and a left part of the rear side wall 219 in a counterclockwise direction. Furthermore, the flow splitting structure 216 enables the second gas flow 6 to enter the second arc-shaped structure 215 substantially in a tangential direction of the second arc-shaped structure 215. Under a pushing action of a subsequent gas flow, the second gas flow 6 can rise centrifugally and rotationally along the second arc-shaped structure 215, the right side wall 218 and a right part of the rear side wall 219 in a clockwise direction.

It can be understood that the hollow chamber 213 includes two gas passages. The first arc-shaped structure 214, the left side wall 217 and the left part of the rear side wall 219 form a first gas passage. The second arc-shaped structure 215, the right side wall 218 and the right part of the rear side wall 219 form a second gas passage. After the gas enters the hollow chamber 213 from the air inlet 212, it is split into the first gas flow 5 and the second gas flow 6 by the flow splitting structure 216. The first gas flow 5 can rise centrifugally and rotationally along an inner wall of the first gas passage, and the second gas flow 6 can rise centrifugally and rotationally along an inner wall of the second gas passage.

By enabling the first gas flow 5 and the second gas flow 6 to rise centrifugally and rotationally, travels of the first gas flow 5 and the second gas flow 6 in the body 21 of the condenser 2 are lengthened, so that the cooling effect can be improved. In addition, as compared with the condenser disclosed in Chinese patent publication No. CN104711833B, in the case of the same size in the width direction, the size of the condenser 2 of the present disclosure in the length direction is larger; accordingly, the heat exchange space in the body 21 of the condenser 2 is larger, and the cooling effect is better.

It should be noted that the condenser 2 of the present disclosure is not simply a parallel arrangement of the condensers disclosed in Chinese patent publication No. CN104711833B, but creatively provides the flow splitting structure 216 on the front side wall of the hollow chamber 213; the gas entering from the air inlet 212 is split into the first gas flow 5 and the second gas flow 6 by the flow splitting structure 216, so that the first gas flow 5 and the second gas flow 6 rotationally rise respectively.

With continued reference to FIG. 4 and FIG. 5, both of which are cross sectional views of section A-A in FIG. 3. But FIG. 4 and FIG. 5 show two kinds of flow splitting structure 216 of different shapes. These two kinds of flow splitting structure 216 are both preferred embodiments of the present disclosure. Although the specific shapes of the flow splitting structure 216 in FIG. 4 and the flow splitting structure 216 in FIG. 5 are different, the flow splitting structure 216 in FIG. 4 and the flow splitting structure 216 in FIG. 5 are both arranged in a left-and-right symmetrical manner; moreover, central lines thereof coincide with a central line of the air inlet 212. Through such an arrangement, the first gas flow 5 and the second gas flow 6 can have substantially the same flow rate. As such, when the first gas flow 5 and the second gas flow 6 meet at a position close to the rear side wall 219, they will not scatter each other, but can jointly flow toward the front side wall in parallel under the interaction, and then respectively enter the first arc-shaped structure 214 and the second arc-shaped structure 215 arranged on the front side wall.

As can be seen FIG. 4, the flow splitting structure 216 in FIG. 4 includes a first arc-shaped flow splitting part 2161 and a second arc-shaped flow splitting part 2162. A left end of the first arc-shaped flow splitting part 2161 is smoothly connected with the first arc-shaped structure 214, a right end of the first arc-shaped flow splitting part 2161 is smoothly connected with a left end of the second arc-shaped flow splitting part 2162, and a right end of the second arc-shaped flow splitting part 2162 is smoothly connected with the second arc-shaped structure 215. The gas entering from the air inlet 212 hits the flow splitting structure 216 and is split into the first gas flow 5 and the second gas flow 6. The first gas flow 5 flows toward the first arc-shaped structure 214 along the first arc-shaped flow splitting part 2161, and the second gas flow 6 flows toward the second arc-shaped structure 215 along the second arc-shaped flow splitting part 2162.

As can be seen from FIG. 5, the flow splitting structure 216 in FIG. 5 is a structure formed jointly by a right end of the first arc-shaped structure 214 and a left end of the second arc-shaped structure 215. The gas entering from the air inlet 212 hits the flow splitting structure 216 and is split into the first gas flow 5 and the second gas flow 6. The first gas flow 5 directly flows into the first arc-shaped structure 214, and the second gas flow 6 directly flows into the second arc-shaped structure 215.

With continued reference to FIG. 6, the rear side wall 219 of the hollow chamber 213 is provided with a first arc-shaped guide structure 2191 and a second arc-shaped guide structure 2192. Under the guidance of the first arc-shaped guide structure 2191, the first gas flow 5 can smoothly flow toward the first arc-shaped structure 214. Similarly, under the guidance of the second arc-shaped guide structure 2192, the second gas flow 6 can also smoothly flow toward the second arc-shaped structure 215. That is, under the guiding action of the first arc-shaped guide structure 2191 and the second arc-shaped guide structure 2192, the first gas flow 5 and the second gas flow 6 can be prevented from a direct head-on collision with each other. When the first gas flow 5 and the second gas flow 6 meet, a movement trend of the first gas flow 5 and a movement trend of the second gas flow 6 are both towards the front side wall. Therefore, after the first gas flow 5 and the second gas flow 6 meet, they can interact with each other, so that the first gas flow 5 can smoothly move toward the first arc-shaped structure 214, and the second gas flow 6 can smoothly move toward the second arc-shaped structure 215.

It should be noted that in order to ensure that the first gas flow 5 and the second gas flow 6 can each rotationally rise independently, a middle partition plate can be provided in the hollow chamber 213. A front side of the middle partition plate is smoothly connected with the first arc-shaped structure 214 and the second arc-shaped structure 215 respectively, and a rear side of the middle partition plate is smoothly connected with the left part and the right part of the rear side wall 219 respectively. By providing the middle partition plate, the hollow chamber 213 can be split into two chambers. The first gas flow 5 can rise centrifugally and rotationally along an inner wall of the left chamber, and the second gas flow 6 can rise centrifugally and rotationally along an inner wall of the right chamber.

With continued reference to FIG. 6, the left part of the rear side wall 219 of the hollow chamber 213 is provided with a first water intercepting groove 2193, the right part of the rear side wall 219 is provided with a second water intercepting groove 2194, and both the first water intercepting groove 2193 and the second water intercepting groove 2194 extend in a height direction of the hollow chamber 213. When the first gas flow 5 flows through the first water intercepting groove 2193, water droplets carried by the first gas flow 5 are intercepted by the first water intercepting groove 2193, so that the water droplets are separated from the first gas flow 5 to prevent the water droplets from flowing into the fan 3 along with the first gas flow 5. Similarly, when the second gas flow 6 flows through the second water intercepting groove 2194, water droplets carried by the second gas flow 6 are intercepted by the second water intercepting groove 2194, so that the water droplets are separated from the second gas flow 6 to prevent the water droplets from flowing into the fan 3 along with the second gas flow 6.

Next, reference is made to FIGS. 3, 4 and 7. The front side wall of the hollow chamber 213 is provided with a water guide groove 220. A top end of the water guide groove 220 is connected with the water outflow end of the cooling water pipe 22, and a bottom end of the water guide groove 220 is connected with the flow splitting structure 216. When the washing-drying integrated machine is running, the cooling water pipe 22 supplies cooling water into the hollow chamber 213. After the cooling water enters the water guide groove 220, it flows downward along the water guide groove 220. When the cooling water flows to the flow splitting structure 216, it is hit by the gas (the gas entering from the air inlet 212 will directly hit the flow splitting structure 216). Under the action of the hitting force, the water flow is broken up into water films, the heat exchange area becomes larger, and a more sufficient heat exchange can be performed with the gas, which can improve the cooling effect. Moreover, after the water flow is broken up, it can still move together with the first gas flow 5 and the second gas flow 6, thus further increasing the heat exchange area and further improving the cooling effect.

It should be noted that when this cooling method is adopted, it is preferable to use the flow splitting structure 216 shown in FIG. 4, which has a large surface area and which is more advantageous for breaking up the water flow.

With continued reference to FIG. 7, the flow splitting structure 216 is inclinedly arranged in a direction away from the rear side wall 219 from top to bottom. Through such an arrangement, the adhesion between the cooling water and the surface of the flow splitting structure 216 can be reduced, so that the water flow can be broken up more easily.

With continued reference to FIG. 7, the water guide groove 220 is inclinedly arranged in a direction approaching the rear side wall 219 from top to bottom. Through such an arrangement, the cooling water can be prevented from coming out of contact with the water guide groove 220, and the cooling water can smoothly flow along the water guide groove 220.

Hitherto, the technical solutions of the present disclosure have been described in connection with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

What is claimed is:

1. A condenser for a drying apparatus, the condenser comprising:
a body and a cooling water pipe, and a water outflow end of the cooling water pipe in communication with a hollow chamber formed inside the body, and
a front side wall of the hollow chamber is provided with a first arc-shaped structure, a second arc-shaped structure and a flow splitting structure located between the first arc-shaped structure and the second arc-shaped structure; a gas inlet is provided on a rear side wall of the hollow chamber, and the flow splitting structure is opposite to the gas inlet; both a left side wall and a right side wall of the hollow chamber are configured to be arc-shaped, two ends of the left side wall are smoothly connected with the first arc-shaped structure and the rear side wall respectively, and two ends of the right side wall are smoothly connected with the second arc-shaped structure and the rear side wall respectively; the flow splitting structure is arranged to be capable of splitting a gas entering from the gas inlet into a first gas flow and a second gas flow, and is arranged to enable the first gas flow and the second gas flow to enter the first arc-shaped structure and the second arc-shaped structure substantially in a tangential direction of the first arc-shaped structure and a tangential direction of the second arc-shaped structure respectively, thereby enabling the first gas flow to rise centrifugally and rotationally along the first arc-shaped structure, the left side wall and a left part of the rear side wall, and enabling the second gas flow to rise centrifugally and rotationally along the second arc-shaped structure, the right side wall and a right part of the rear side wall.

2. The condenser according to claim 1, wherein the flow splitting structure is arranged in a left-and-right symmetrical manner, and a central line of the flow splitting structure coincides with a central line of the gas inlet, so that the first gas flow and the second gas flow have substantially the same flow rate.

3. The condenser according to claim 1, wherein the rear side wall is provided with a first arc-shaped guide structure and a second arc-shaped guide structure, so that the first gas flow and the second gas flow can smoothly flow toward the first arc-shaped structure and the second arc-shaped structure respectively.

4. The condenser according to claim 1, wherein the front side wall is provided with a water guide groove, a top end of the water guide groove is connected with the water outflow end of the cooling water pipe, and a bottom end of the water guide groove is connected with the flow splitting structure.

5. The condenser according to claim 4, wherein the water guide groove is inclinedly arranged in a direction approaching the rear side wall from top to bottom.

6. The condenser according to claim 4, wherein the flow splitting structure is inclinedly arranged in a direction away from the rear side wall from top to bottom.

7. The condenser according to claim 4, wherein the flow splitting structure comprises a first arc-shaped flow splitting part and a second arc-shaped flow splitting part; one end of the first arc-shaped flow splitting part is smoothly connected with the first arc-shaped structure, the other end of the first arc-shaped flow splitting part is smoothly connected with one end of the second arc-shaped flow splitting part, and the other end of the second arc-shaped flow splitting part is smoothly connected with the second arc-shaped structure.

8. The condenser according to claim 1, wherein the left part of the rear side wall is provided with a first water intercepting groove, so that water droplets in the first gas flow are separated from the first gas flow.

9. The condenser according to claim 1, wherein the right part of the rear side wall is provided with a second water intercepting groove, so that water droplets in the second gas flow are separated from the first gas flow.

10. A drying apparatus, comprising the condenser according to claim 1.

* * * * *